United States Patent
Braillard et al.

(10) Patent No.: US 10,320,011 B2
(45) Date of Patent: Jun. 11, 2019

(54) FUEL CELL SYSTEM

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Vincent Braillard, Clermont-Ferrand (FR); Gino Paganelli, Clermont-Ferrand (FR)

(73) Assignee: Campagnie Generale des Etablissements Michelin, Clermont-Ferrand (FR)

( * ) Notice: Subject to any disclaimer, the term of this patent is extended or adjusted under 35 U.S.C. 154(b) by 58 days.

(21) Appl. No.: 15/537,467

(22) PCT Filed: Dec. 17, 2015

(86) PCT No.: PCT/EP2015/080173
§ 371 (c)(1),
(2) Date: Jun. 19, 2017

(87) PCT Pub. No.: WO2016/097115
PCT Pub. Date: Jun. 23, 2016

(65) Prior Publication Data
US 2017/0352896 A1 Dec. 7, 2017

(30) Foreign Application Priority Data

Dec. 19, 2014 (FR) .................................. 14 62906

(51) Int. Cl.
*H01M 8/04029* (2016.01)
*H01M 8/04223* (2016.01)
*H01M 8/1018* (2016.01)

(52) U.S. Cl.
CPC ... *H01M 8/04029* (2013.01); *H01M 8/04253* (2013.01); *H01M 8/04268* (2013.01); *H01M 2008/1095* (2013.01)

(58) Field of Classification Search
CPC ......... H01M 8/04029; H01M 8/04253; H01M 8/04268
(Continued)

(56) References Cited

U.S. PATENT DOCUMENTS 5,605,770 A * 2/1997 Andreoli ........... H01M 8/04029
429/413
9,389,280 B2 7/2016 Paganelli et al. .. G01R 31/3658
(Continued)

FOREIGN PATENT DOCUMENTS

| FR | 2 971 089 A1 | 8/2012 |
| WO | WO 2005/078847 A1 | 8/2005 |
| WO | WO 2005/119825 A2 | 12/2005 |

OTHER PUBLICATIONS

Feb. 26, 2016 International Search Report and Written Opinion in International Patent Appln. No. PCT/EP2015/080173.

*Primary Examiner* — Jayne L Mershon
(74) *Attorney, Agent, or Firm* — Venable LLP

(57) ABSTRACT

A fuel-cell stack system includes a stack of electrochemical cells, a fuel gas supply circuit and an oxidant gas supply circuit, a cooling circuit, a micropump, a temperature measurement device, and a controller. The cells are separated by bipolar plates, with each bipolar plate including an anode, a cathode, and an ion-exchange membrane. The cooling circuit, which is structured to enable a coolant fluid to circulate therein, includes a secondary circuit and a primary circuit that is smaller in size than the secondary circuit, with the primary and secondary circuits being isolated from each other by a thermostatic valve. The micropump is installed at an outlet of the stack and enables a volume of water inside (Continued)

the stack to be mixed. The temperature measurement device determines an internal temperature of a core of the stack. The primary circuit is activated when the internal temperature rises above a predetermined threshold.

6 Claims, 2 Drawing Sheets

(58) Field of Classification Search
    USPC .................................................... 429/457
    See application file for complete search history.

(56) References Cited

U.S. PATENT DOCUMENTS

| | | | |
|---|---|---|---|
| 2003/0017375 A1 | 1/2003 | Kanno | 429/24 |
| 2003/0077487 A1 | 4/2003 | Roberts et al. | |
| 2004/0013915 A1 | 1/2004 | Matsuoka | |
| 2005/0271908 A1* | 12/2005 | Lin | H01M 8/04029 429/429 |
| 2006/0134483 A1* | 6/2006 | Gallagher | H01M 8/04007 429/429 |
| 2007/0178342 A1 | 8/2007 | Hoch | 429/22 |
| 2010/0190078 A1* | 7/2010 | Rapaport | H01M 8/04126 429/444 |
| 2012/0003557 A1 | 1/2012 | Tanaka et al. | 429/429 |
| 2012/0100449 A1 | 4/2012 | Araki et al. | 429/429 |
| 2014/0017581 A1* | 1/2014 | Drouhault | H01M 8/04029 429/413 |
| 2014/0017585 A1 | 1/2014 | Glipa et al. | 429/434 |
| 2014/0227571 A1 | 8/2014 | Paganelli et al. | H01M 10/4285 |
| 2015/0136352 A1 | 5/2015 | Paganelli et al. | H01M 8/04074 |
| 2015/0325871 A1 | 11/2015 | Paganelli et al. | H01M 8/04671 |
| 2017/0324105 A1 | 11/2017 | Braillard et al. | |
| 2017/0338501 A1 | 11/2017 | Paganelli et al. | |
| 2017/0352895 A1 | 12/2017 | Braillard et al. | |

* cited by examiner

FUEL CELL SYSTEM

FIELD OF THE INVENTION

The present invention relates to fuel cell stacks and in particular, but not exclusively, to fuel cell stacks in which the electrolyte takes the form of a polymer membrane (i.e. PEFCs (polymer electrolyte fuel cells)).

More particularly, the present invention relates to a fuel cell stack system intended to be used, and in particular started up, under especially cold temperature conditions.

PRIOR ART

It is known that fuel cell stacks make it possible to generate electrical power directly, via an electrochemical redox reaction, from a fuel gas and an oxidant gas, without an intermediate conversion to mechanical energy. This technology seems promising for automotive applications in particular. A fuel cell stack generally includes a stack of basic cells, each comprising an anode, a cathode and an ion exchange membrane acting as an electrolyte. During the operation of a fuel cell stack, two simultaneous electrochemical reactions take place: an oxidation of the fuel at the anode, and a reduction of oxidant at the cathode. These two reactions produce positive and negative ions which combine together at the membrane and generate electricity in the form of a potential difference. In the case of an oxygen-hydrogen fuel cell, it is the $H^+$ and $O^-$ ions that combine together.

The membrane electrode assemblies, or cells, are stacked in series and separated by a bipolar plate that conducts the electrons from the anode of one cell to the cathode of the neighbouring cell. For this purpose, channels are provided over both faces of the bipolar plates in contact with the membrane electrode assemblies. Each channel has an inlet through which the fuel or the oxidant enters, and an outlet through which excess gases and the water produced by the electrochemical reaction are discharged.

Fuel cell stacks have numerous potential applications, in particular mobile applications. In this case, they may be called upon to operate under extreme temperature conditions. Thus, when the exterior temperature drops substantially below zero, for example of the order of −20° C., the internal temperature of the fuel cell stack also drops, until occasionally reaching temperatures below 0° C. The objective of a cold start procedure for a fuel cell stack is to raise the internal temperature of the fuel cell stack above the freezing point of water before the fuel cell stack starts to discharge the water produced by the electrochemical reaction. In order to allow instantaneous start-up and to avoid parasitic power consumption, it is not possible to envisage pre-heating the fuel cell stack before the negative temperature start-up.

It has been observed that the operation of a fuel cell stack at temperatures substantially below zero becomes especially critical at the moment of start-up. Thus, it would be useful to provide fuel cell stack systems that are capable of starting up at these temperatures.

For example, a fuel cell stack system provided with a cooling circuit that is subdivided into two portions is known from application WO 2005/078847. Thus, the cooling circuit comprises a primary circuit and a secondary circuit. The smaller, secondary, circuit is provided with a small pump, allowing solely the volume of water inside the stack to be mixed, without it being sent back through the primary circuit. Thus, the hot water discharged by the stack is more quickly returned to the fuel cell stack, without having had the time to cool down, thereby facilitating the cold start of the stack.

In a first instance, the primary cooling circuit is not active, since only the pump of the secondary circuit is in operation. Now, in such a system, temperature sensors are placed in the primary cooling circuit, in order to determine the moment at which it becomes necessary to start cooling. If the primary circuit is not in operation, it becomes impossible to obtain such temperature information, which is dangerous since situations of local overheating within the secondary circuit may come about without the primary circuit being activated.

The present invention therefore aims to remedy this drawback, by providing a fuel cell stack system allowing a cold start while guaranteeing the integrity of the stack.

BRIEF DESCRIPTION OF THE INVENTION

Thus, the invention relates to a fuel cell stack system including:
- a stack of electrochemical cells separated by bipolar plates, and each comprising an anode, a cathode and an ion exchange membrane;
- a fuel gas supply circuit and an oxidant gas supply circuit; and
- a cooling circuit allowing a coolant fluid to circulate, the cooling circuit comprising a secondary circuit and a primary circuit that is smaller in size than the secondary circuit, which circuits are isolated from one another by a thermostatic valve;
- a micropump, at the outlet of the stack, and allowing the volume of water inside the stack to be mixed, and the system additionally including means for determining an internal temperature of the stack core, and means for activating the primary cooling circuit when the internal temperature rises above a predetermined threshold.

In one preferred embodiment, the system additionally comprises means for determining a temperature in the primary cooling circuit. These means take, for example, the form of temperature sensors installed in the primary circuit.

In one preferred embodiment, the means for activating the primary circuit include means for activating, in continuous and/or pulsed mode, a pump installed in the primary circuit.

The activation mode of the pump depends on the determined internal temperature as well as the temperature in the cooling circuit.

When the internal temperature of the stack is above a first predetermined threshold, and the temperature of the coolant liquid before entering the stack is below a second predetermined threshold, the cooling pump is ordered to operate in pulsed mode.

When the temperature in the cooling circuit rises above the second predetermined threshold, the cooling pump is ordered to operate in continuous mode.

The internal temperature of the stack is an estimate of the stack core temperature. The first predetermined threshold is chosen such that the coolant liquid is not set in motion too soon, which could lead to sudden cooling with the risk of freezing the water produced in the stack. The second threshold is chosen so as to avoid any local overheating of the uncooled fuel cell stack, without however causing a drop in voltage across the terminals of the cells of the stack.

Specifically, activation of the cooling pump in pulsed mode makes it possible to instill water that is still cold into the stack gradually, and thus to hold an acceptable voltage across the terminals of the cells of the fuel cell stack.

In another embodiment, as an alternative to pulsed mode control, a variable speed cooling pump with a very low flow rate capacity is used. In this case, the pump is activated solely in continuous mode. However, the viscosity of the coolant liquid at very low temperature is very high and a low flow rate is difficult to achieve using a conventional cooling pump designed for a liquid of lower viscosity and a much higher flow rate. Pulsed mode control allows the necessary level of finesse in the control of the average flow rate to be achieved without having to use a highly elaborate pump. Pulsed mode control additionally makes it possible to provide a better guarantee that the liquid is properly set in motion without necessarily having to use a flow meter.

In one advantageous embodiment, the internal temperature of the stack is determined while taking account of the heat capacity and the mass of the materials constituting the stack, and the thermal energy dissipated by the stack. Thus, a formula of the following type is used:

$$\text{Teta\_FC} = \sum_{k=0}^{n} \frac{((UCell_{LHV} \cdot NbCell) - U_{FC}) \cdot I_{FC}}{M_1 \cdot C_1 + M_2 \cdot C_2} + Teta_{init}$$

$$UCell_{LHV} = \frac{MW_{H2} \cdot LHV \cdot 1000}{2 \cdot F} = 1.2531 \text{ V}$$

Where:
Teta FC: Estimated temperature of the PEMFC [° C.]
NbCell: Number of cells forming the stack [16]
UFC: Total voltage on the stack [V]
IFC: Stack current [A]
M1: Mass of the coolant liquid inside the PEMFC [kg]
C1: Heat capacity of the coolant liquid [J/kgK]
M2: Mass of the bipolar plates [kg]
C2: Heat capacity of the bipolar plates [J/kg/K]

In one particular embodiment, the applied start-up current is a ramp from 0.015 A/cm$^2$/s, with a maximum value of 0.5 A/cm$^2$. This corresponds, for a stack of 200 cm$^2$, to a current of 100 A. However, in certain situations, the application of such a ramp may lead to a substantial drop in the voltage across the terminals of the cells of the fuel cell stack. In order to avoid such a collapse and its consequences on the operation of the stack, the applied current is adjusted, in one particular embodiment, so as to guarantee that the voltage across the terminals of each of the cells is higher than or equal to 0.2 volt. This is achieved using a regulator that transmits a maximum current value to a unit for controlling the power delivered by the fuel cell stack, such as a DC-to-DC converter, for example.

In yet another embodiment, the method for controlling the fuel cell stack includes a phase of drying out the fuel cell stack beforehand using atmospheric air, this dry-out phase taking place before the ambient temperature drops below 0° C. In one embodiment, this temperature is set to 5° C.

The pump is controlled such that the activation time is constant. This is set to the minimum required to guarantee that the coolant fluid is set in motion under all circumstances. It is dependent on the dynamics of the pump and on head losses in the circuit of the stack. For example, the duration of operation is set to 0.6 second. The standstill time of the pump between two pulses is variable. It is expected for the temperature model of the stack to return a temperature that is 1° C. higher with respect to the preceding pulse so as to cause a gradual increase in the temperature of the core of the fuel cell stack. The time between two pulses is moreover limited to between a minimum time of 2 seconds and a maximum time of 12 seconds. In another embodiment, the duration of standstill of the pump is determined so as to guarantee that the mean voltage across the terminals of the cells of the stack returns to a value that is higher than a predetermined value between two pulses, for example 0.6 V. Specifically, each pulse results in the introduction of a small amount of coolant liquid that is still very cold, resulting in a drop in the voltage of the cells.

In one preferred embodiment, the system additionally comprises means for drying out the ion exchange membranes when shutting down the fuel cell stack system.

In one exemplary embodiment corresponding to a fuel cell stack of 16 cells of 200 cm$^2$, this dry-out with air is performed using the following parameters:

The dry-out is performed using atmospheric air blown by a compressor.

At the anode, the air is blown at a flow rate of 15 liters per minute.

At the cathode, the air is blown at a flow rate of 85 liters per minute.

The dry-out is performed when the ambient temperature falls below 5° C.; it is stopped once the impedance of the stack, measured at 1 kHz, reaches the value of 40 milliohms.

In addition, the dry-out is preferably performed after a period of operation of the stack just before the latter is shut down with a cathode stoichiometry that is higher than or equal to 2.8, and preferably without wetting.

Under these conditions, the dry-out is performed in less than 90 seconds. Under other conditions, for example if the stoichiometry was previously 2, the dry-out time then becomes equal to around seven minutes.

In one preferred embodiment, the system additionally includes a device for measuring the moisture content of the ion exchange membranes. This device takes the form, for example, of a current generator that supplies the stack with a current at a frequency of 1000 Hz. The voltage ripples across the terminals of at least one cell are then measured, and the impedance of the membrane is thus determined. The moisture content can be deduced from this impedance.

BRIEF DESCRIPTION OF THE FIGURES

Other objectives and advantages of the invention will appear clearly in the following description of a preferred, but non-limiting, embodiment, illustrated by the following figures in which.

DESCRIPTION OF THE BEST EMBODIMENT OF THE INVENTION

Figure 1:
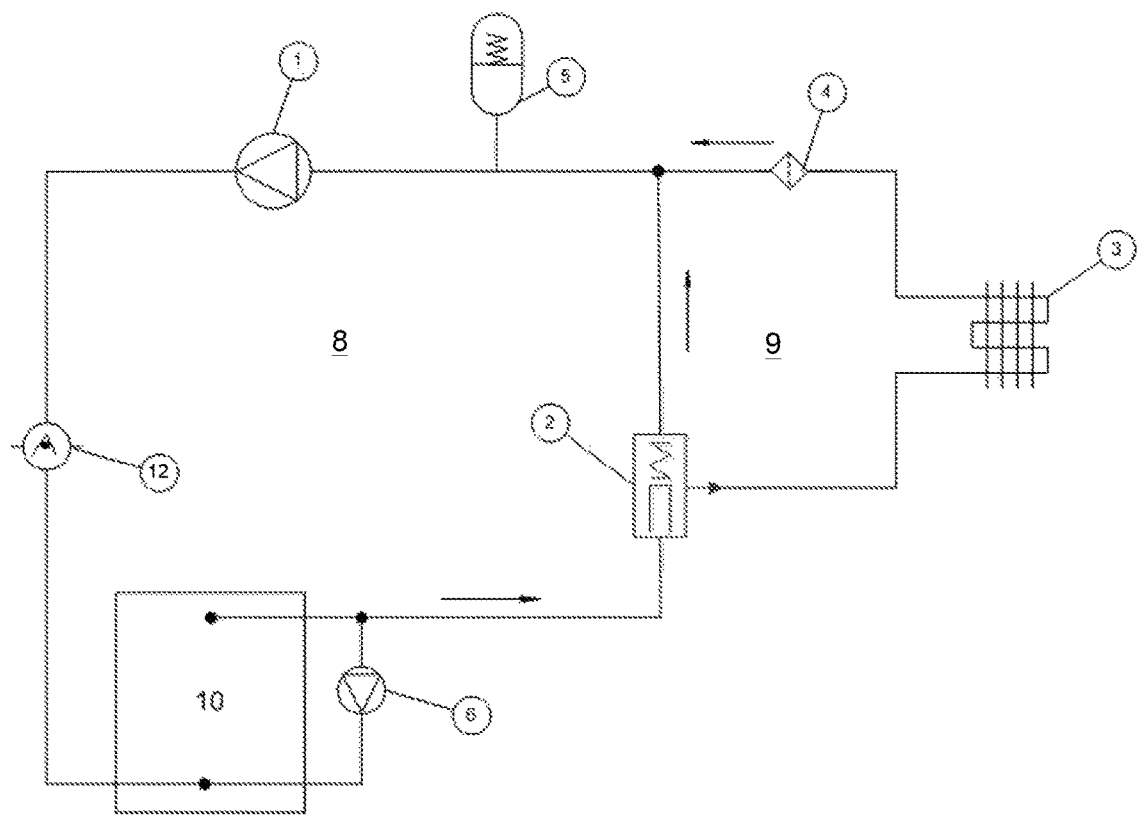
FIG. 1 shows a system according to the invention.

FIG. 1 shows a system according to the invention, including a stack of electrochemical cells 10. The system comprises a liquid cooling circuit, divided into a primary circuit 8 and a secondary circuit 9. The volume of the primary circuit is minimized with respect to the systems of the prior art, and isolated from the secondary circuit by a thermostatic valve 2.

The primary circuit is provided with a cooling pump 1. As described above, this pump may advantageously be activated in continuous and/or pulsed mode in the context of starting up the stack at temperatures substantially below zero.

The system also comprises a deionization filter 4, an expansion tank 5 and a radiator 3.

A small pump, also referred to as a "micropump" throughout the remainder of the description, 6 is installed at the outlet of the stack 10. This small pump allows the volume of water inside the stack to be mixed, with a minimum of external circuit. Such a construction makes it possible to homogenize the temperature at the core of the stack, thereby facilitating start-up at temperatures below zero by preventing the freezing of the water arising from the electrochemical reaction that takes place in the stack and by preventing the occurrence of local hot points without substantially increasing the amount of water to be warmed. Advantageously, it is useful for the micropump to be positioned as close to the stack as possible. Specifically, a greater distance would involve an increase in the volume of water to be warmed and additional losses, which could compromise the success of the cold start. Specifically, the possibility to cold-start a stack depends on the capacity of the stack to raise its core temperature above freezing point before the water produced by the reaction starts to be discharged.

Figure 2:
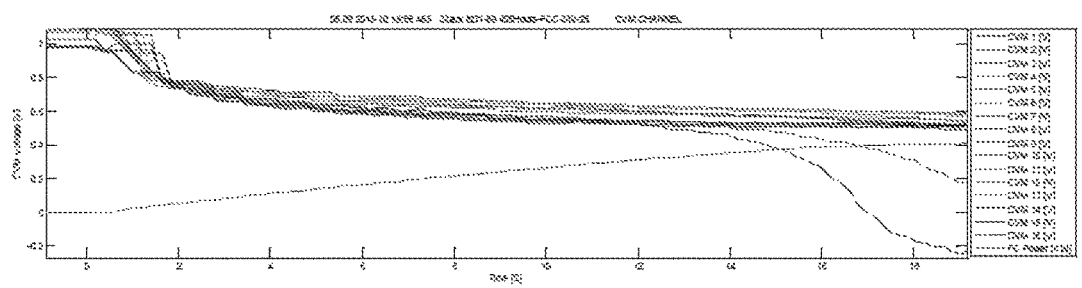
FIG. 2 shows the voltages across the terminals of the cells of a fuel cell stack in the case that the cooling pump is activated in continuous mode in a cold start phase.

The circuit shown in FIG. 1 must also be provided with a non-return valve 12 so as to guarantee that all of the flow produced by the micropump 6 passes through the stack. FIG. 2 shows the variation in the voltages across the terminals of the cells of a fuel cell stack during a cold start at −15° C. managed according to the methods of the prior art, namely by operating the cooling pump in continuous mode.

A gradual decrease in the voltage across the terminals of the set of cells is observed, followed by a collapse, starting at 13 seconds, of the voltage across the terminals of the first cell (lowest curve on the graph), followed shortly after by the voltage across the terminals of the second cell.

This rapid drop in voltage reveals a blockage linked to the freezing of the water produced in the fuel cell stack. As a result, the operation of the stack is negatively affected.

Figure 3:
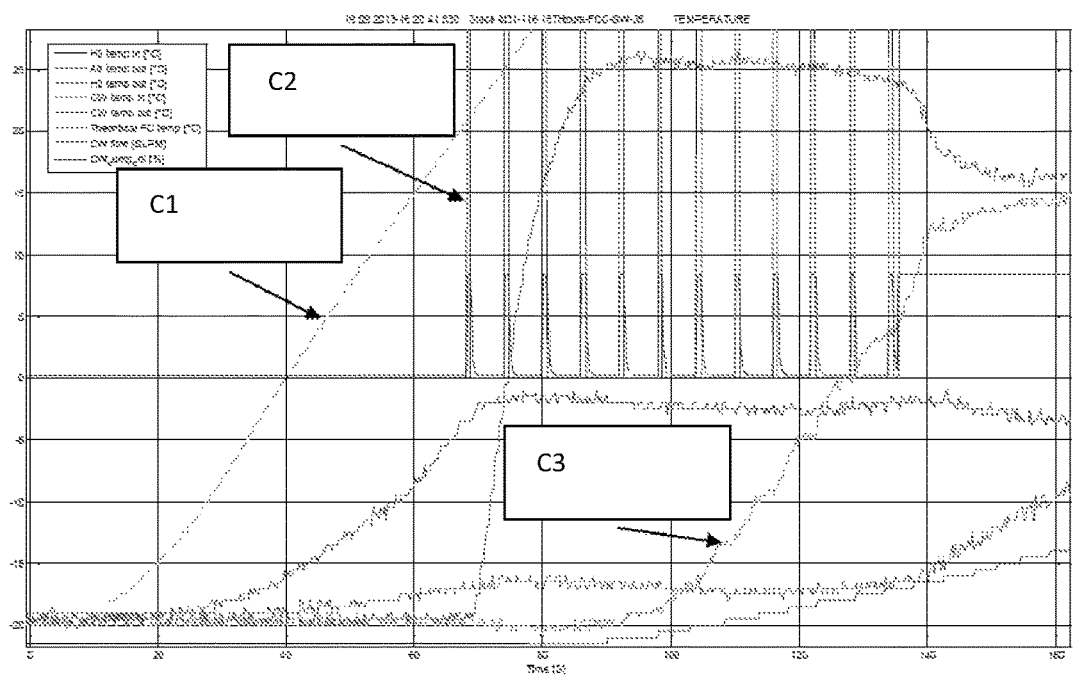
FIG. 3 shows the variation in multiple temperatures within the fuel cell stack in the case that the cooling pump is started up after a delay, and activated in pulsed mode in a cold start phase.
Figure 4:
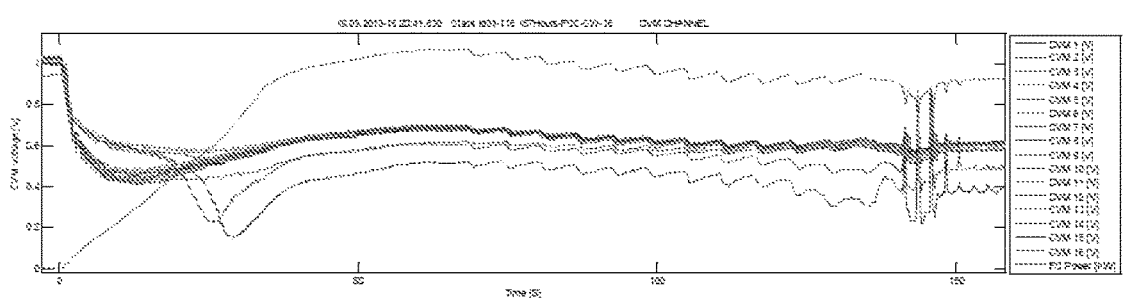
FIG. 4 shows the voltages across the terminals of the cells of a fuel cell stack in the case that the cooling pump is started up after a delay, and activated in pulsed mode in a cold start phase.

FIGS. 3 and 4 show the variation in parameters in a fuel cell stack for which a control method according to the invention is implemented. Thus, these two graphs show the variation for a cold start during which the stack is first operated with only the micropump active, then the main cooling pump is operated in pulsed mode.

In FIG. 3, the curve C1 shows the estimated temperature of the fuel cell stack, the curve C2 shows the control setpoint of the cooling pump and the curve C3 shows the temperature at the inlet of the stack. After around 65 seconds, the temperature, shown by curve C1, reaches a value of 20° C. This value corresponds to a first predetermined threshold in one embodiment of the invention. The cooling pump, or water pump, is then controlled in pulsed mode, as shown on the curve C2.

After 135 seconds of operation, the temperature of the coolant liquid at the inlet of the stack, shown on curve C3, becomes higher than 5° C. This value corresponds to a second predetermined threshold in one embodiment of the invention. The cooling pump is then operated in continuous mode. From this moment on, the coolant liquid circulates continuously, resulting in quite a rapid decrease, then disappearance, of the difference in temperature of the coolant liquid between the inlet and the outlet of the fuel cell stack.

At the same time, FIG. 4 shows the corresponding variation in the individual voltages of the cells of the fuel cell stack when a method according to the invention is implemented. It is observed in this figure that, unlike in FIG. 1, the first cells of the fuel cell stack retain an acceptable voltage level, or have a voltage level that quickly bounces back, when the cooling pump is activated. The cooling pump is activated in pulsed mode. It is observed that each injection of cold water results in a drop in the set of voltages, shown in FIG. 3 by ripples. The frequency of the pulses of the cooling pump, and hence of the injection of coolant liquid, is determined so as to allow time for the voltage across the terminals of the cells to return to an acceptable level before another injection. In the present example, one injection takes place every six seconds.

Thus, the use of a system according to the invention makes it possible to warm up the liquid contained in the cooling circuit while holding an acceptable voltage across the terminals of the cells of the fuel cell stack throughout the start-up phase and while guaranteeing a good level of uniformity of the temperature within the stack despite the delayed activation of the cooling pump.

The invention claimed is:

1. A fuel-cell stack system, comprising:
   a stack of electrochemical cells separated by bipolar plates, each of the bipolar plates including an anode, a cathode, and an ion-exchange membrane;
   a fuel gas supply circuit and an oxidant gas supply circuit;
   a cooling circuit structured to enable a coolant fluid to circulate therein, the cooling circuit including (a) a secondary circuit and (b) a primary circuit that is smaller in size than the secondary circuit, the primary and secondary circuits being isolated from each other by a thermostatic valve;
   a micropump installed at an outlet of the stack, the micropump being structured to enable a volume of water inside the stack to be mixed; and
   a core temperature measurement device arranged to determine an internal temperature of a core of the stack,
   wherein the primary circuit is activated when the internal temperature rises above a predetermined threshold,
   wherein a pump, other than the micropump, is installed in the primary circuit,
   wherein when the primary circuit is activated, the pump is activated in a pulsed mode, and
   wherein when the internal temperature rises above a second predetermined threshold, the pump switches from operating in the pulsed mode to operating in a continuous mode.

2. The system according to claim 1, further comprising a cooling-circuit temperature measurement device arranged to determine a temperature in the primary circuit.

3. The system according to claim 1, further comprising a dryer, which dries out the ion-exchange membranes when shutting down the system.

4. The system according to claim 1, further comprising a moisture measurement device arranged to measure a moisture content of the ion-exchange membranes.

5. The system according to claim 1, wherein in the pulsed mode, a time between two pulses is selected from within a range of 2 to 12 seconds.

6. The system according to claim 5, wherein in the pulsed mode, an activation time of the pump is constant for each of a plurality of pulses.

\* \* \* \* \*

UNITED STATES PATENT AND TRADEMARK OFFICE
CERTIFICATE OF CORRECTION

PATENT NO. : 10,320,011 B2  
APPLICATION NO. : 15/537467  
DATED : June 11, 2019  
INVENTOR(S) : Vincent Braillard Page 1 of 1

It is certified that error appears in the above-identified patent and that said Letters Patent is hereby corrected as shown below:

On the Title Page

At item (73), Assignee:  
"Campagnie" should read --Compagnie--.

Signed and Sealed this  
First Day of October, 2019

Andrei Iancu  
*Director of the United States Patent and Trademark Office*